(12) United States Patent
Shingyoji

(10) Patent No.: US 7,508,353 B2
(45) Date of Patent: Mar. 24, 2009

(54) EXTERIOR COMPONENT DISPOSED ON FRONT SURFACE OF RADAR DEVICE OF VEHICLE

(75) Inventor: Masahito Shingyoji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 95 days.

(21) Appl. No.: 11/705,047

(22) Filed: Feb. 12, 2007

(65) Prior Publication Data

US 2007/0210979 A1     Sep. 13, 2007

(30) Foreign Application Priority Data

Mar. 9, 2006    (JP)  .............................. 2006-063973

(51) Int. Cl.
*H01Q 15/02*    (2006.01)

(52) U.S. Cl. ........................... 343/909; 343/872; 342/1; 342/4; 342/13

(58) Field of Classification Search ................. 343/872, 343/909, 711, 713, 700 MS; 342/1, 70, 3, 342/4, 13
See application file for complete search history.

(56) References Cited

U.S. PATENT DOCUMENTS

| 4,200,701 | A | * | 4/1980 | Wetton et al. | .................. 528/44 |
|---|---|---|---|---|---|
| 4,746,541 | A | * | 5/1988 | Marikar et al. | ........... 427/126.1 |
| 6,496,138 | B1 | * | 12/2002 | Honma | ........................ 342/70 |
| 6,750,819 | B2 | * | 6/2004 | Rahaim et al. | ......... 343/700 MS |
| 6,937,184 | B2 | * | 8/2005 | Fujieda et al. | ................. 342/70 |
| 2003/0052810 | A1 | * | 3/2003 | Artis et al. | ...................... 342/1 |
| 2003/0128164 | A1 | * | 7/2003 | Rahaim et al. | ......... 343/700 MS |
| 2004/0125023 | A1 | * | 7/2004 | Fujii et al. | ............ 343/700 MS |
| 2005/0168374 | A1 | * | 8/2005 | Kamiya et al. | .................. 342/1 |

FOREIGN PATENT DOCUMENTS

JP    2000-159039 A    6/2000

* cited by examiner

Primary Examiner—Hoang V Nguyen
(74) Attorney, Agent, or Firm—Arent Fox LLP

(57) ABSTRACT

An exterior vehicle component includes a proximity member disposed along an outer perimeter of an electromagnetic wave transmission member provided at a center of the component which is disposed in front of a radar device. The proximity member includes a chromium-plated portion formed on its front surface which reflects an electromagnetic wave. The proximity member is formed of an acrylate-styrene-acrylonitrile resin or a modified polyphenylene oxide resin having an attenuation coefficient for electromagnetic wave transmission, which is equal to or greater than a predetermined value.

23 Claims, 4 Drawing Sheets

EXTERIOR COMPONENT DISPOSED ON FRONT SURFACE OF RADAR DEVICE OF VEHICLE

RELATED APPLICATION DATA

The present invention is based upon Japanese priority application No. 2006-063973, which is hereby incorporated in its entirety herein by reference.

BACKGROUND OF THE INVENTION

1. Field of the Invention

The present invention relates to an exterior component disposed on a front surface of a radar device of a vehicle and in an electromagnetic wave transmitting and receiving path in front of the radar device mounted on the vehicle.

2. Description of the Related Art

The front grill of an automobile, which is made of resin, usually has a chromium-plated surface which enhances the design's metallic appearance. When a radar device mounted in the rear section of the front grill is used for detecting an obstacle, such as, for example, a vehicle located in front of or ahead of the subject vehicle, an electromagnetic wave transmitted and received by the radar device is reflected from a chromium-plated layer on a front section of the front grill, resulting in a problem wherein the radar device cannot function properly. In order to solve this problem, Japanese Patent Application Laid-open No. 2000-159039 discloses an exterior vehicle component in which a portion of the chromium-plated layer corresponding to an irradiation range of an electromagnetic wave is replaced by an indium-deposited layer by which the electromagnetic wave is transmissible.

An element designed to reflect an electromagnetic wave cannot be disposed in the irradiation range of an electromagnetic wave transmitted from a radar device. Even if the element designed to reflect an electromagnetic wave is present in a region near or proximate to a region outside of the irradiation range, there is a problem that an electromagnetic wave reflected from such an element is superposed on a wave reflected from an object to be detected, such as a vehicle in front of the subject, resulting in a degradation in the detection performance of the radar device.

In this case, the problem is solved by replacing the chromium-plated layer in the area near the region outside of the irradiation range with an indium-deposited layer. However, depositing indium is very expensive compared with chromium plating. Thus, it is desirable to use an inexpensive methodology, such as chromium plating, to coat a layer of the grill and avoid using a more expensive alternative like deposited indium.

SUMMARY OF THE INVENTION

Accordingly, it is an aspect of the present invention to provide an arrangement wherein an object reflecting an electromagnetic wave can be disposed in an area near or proximate to the region outside of an electromagnetic wave transmitting and receiving path extending from a radar device mounted on a vehicle.

In order to achieve the above aspect, according to a first feature of the present invention, there is provided an exterior component disposed on a front surface of a radar device of a vehicle and in an electromagnetic wave transmitting and receiving path and in front of the radar device mounted on the vehicle. The component includes an electromagnetic wave transmission member through which an electromagnetic wave passes and a proximity member disposed outside, in a radial direction thereof, having a surface treatment portion formed on a front surface thereof that reflects an electromagnetic wave. The proximity member is formed from a material having an attenuation coefficient for electromagnetic wave transmission equal to or larger than a predetermined value.

An emblem in an embodiment described below corresponds to an exterior vehicle component according to the present invention. Also, a chromium-plated portion in the embodiment described below corresponds to a portion formed by a surface treatment of the present invention.

With the above-described structural configuration of the first feature, the proximity member is disposed outside of the electromagnetic wave transmission member in a radial direction thereof and is transmissible of the electromagnetic wave in the exterior vehicle component. The proximity member has a portion formed on a front surface thereof by depositing a surface treatment therein so as to reflect an electromagnetic wave. The proximity member is formed of a material having an attenuation coefficient for electromagnetic wave transmission that is equal to or greater than a predetermined value. Therefore, even if the electromagnetic wave transmitted from the radar device mounted on the vehicle passes through the proximity member, the wave is reflected by the surface treatment and is received by the radar device. Thus, the intensity of the electromagnetic wave is suppressed to a low enough value so as to prevent influencing the detection accuracy. Thus, it is unnecessary to use a deposit of expensive indium thereon which does not reflect the electromagnetic wave for the surface treatment of the proximity member. This can contribute to an increase in degree of freedom of the design and a reduction in the cost of the exterior vehicle component.

According to a second feature of the present invention, in addition to the first feature, the proximity member is formed so that the intensity of an electromagnetic wave passing through a rear surface is reflected by the surface treatment and is emitted again from the rear surface at an intensity level equal to or less than that of an electromagnetic wave reflected directly from the rear surface.

With the arrangement of the second feature, the intensity of an electromagnetic wave passing through the rear surface, reflected from the portion formed by the surface treatment and emitted from the rear surface is equal to or less than that of the electromagnetic wave reflected directly at the rear surface. Therefore, it is possible to virtually ignore any influence exerted on the detection accuracy of the radar device by the electromagnetic wave reflected by the portion formed by the surface treatment.

According to a third feature of the present invention, in addition to the second feature, the proximity member has an attenuation coefficient for electromagnetic wave transmission set that corresponds to a thickness of the proximity member.

With the arrangement of the third feature, the attenuation coefficient for the transmitted electromagnetic wave is set by changing the thickness of the proximity member. Therefore, it is easy to set the attenuation coefficient for electromagnetic wave transmission.

According to a fourth feature of the present invention, in addition to any of the first-to-third features, the proximity member is formed of an acrylate-styrene-acrylonitrile resin.

With the arrangement of the fourth feature, the mechanical properties and electromagnetic wave transmission characteristics of the proximity member formed from acrylate-styrene-acrylonitrile resin are improved.

According to a fifth feature of the present invention, in addition to any of the first-to-third features, the proximity member is formed of a resin containing carbon particles or titanium oxide.

With the arrangement of the fifth feature, the electromagnetic wave transmission characteristics of the proximity member formed of the resin containing carbon particles or titanium oxide are improved.

According to a sixth feature of the present invention, in addition to the fifth feature, the resin is a modified phenylene oxide resin.

With the arrangement of the sixth feature, the mechanical properties and the electromagnetic wave transmission characteristics of the proximity member formed of the modified phenylene oxide resin are improved.

According to a seventh feature of the present invention, in addition to any of the first-to-sixth features, the surface treatment on the portion reflecting the electromagnetic wave is metal plating or metal coating.

With the arrangement of the seventh feature, the portion formed by the surface treatment which reflects the electromagnetic wave is the portion formed by metal plating or metal coating, thereby improving the aesthetic appearance of the exterior vehicle component at a low cost.

According to an eighth feature of the present invention, in addition to any of the first-to-seventh features, the exterior vehicle component is an emblem provided on a front grill.

With the arrangement of the eighth feature, the exterior vehicle component is an emblem provided on the front grill, thereby decorating the front grill with the emblem without impairing the function of the radar device.

The above aspect and other aspects, features and advantages of the invention will become apparent from the preferred embodiments taken in conjunction with the accompanying drawings.

DETAILED DESCRIPTION OF PREFERRED EMBODIMENTS

The present invention will now be described by way of embodiments with reference to the accompanying drawings.

Figure 1:
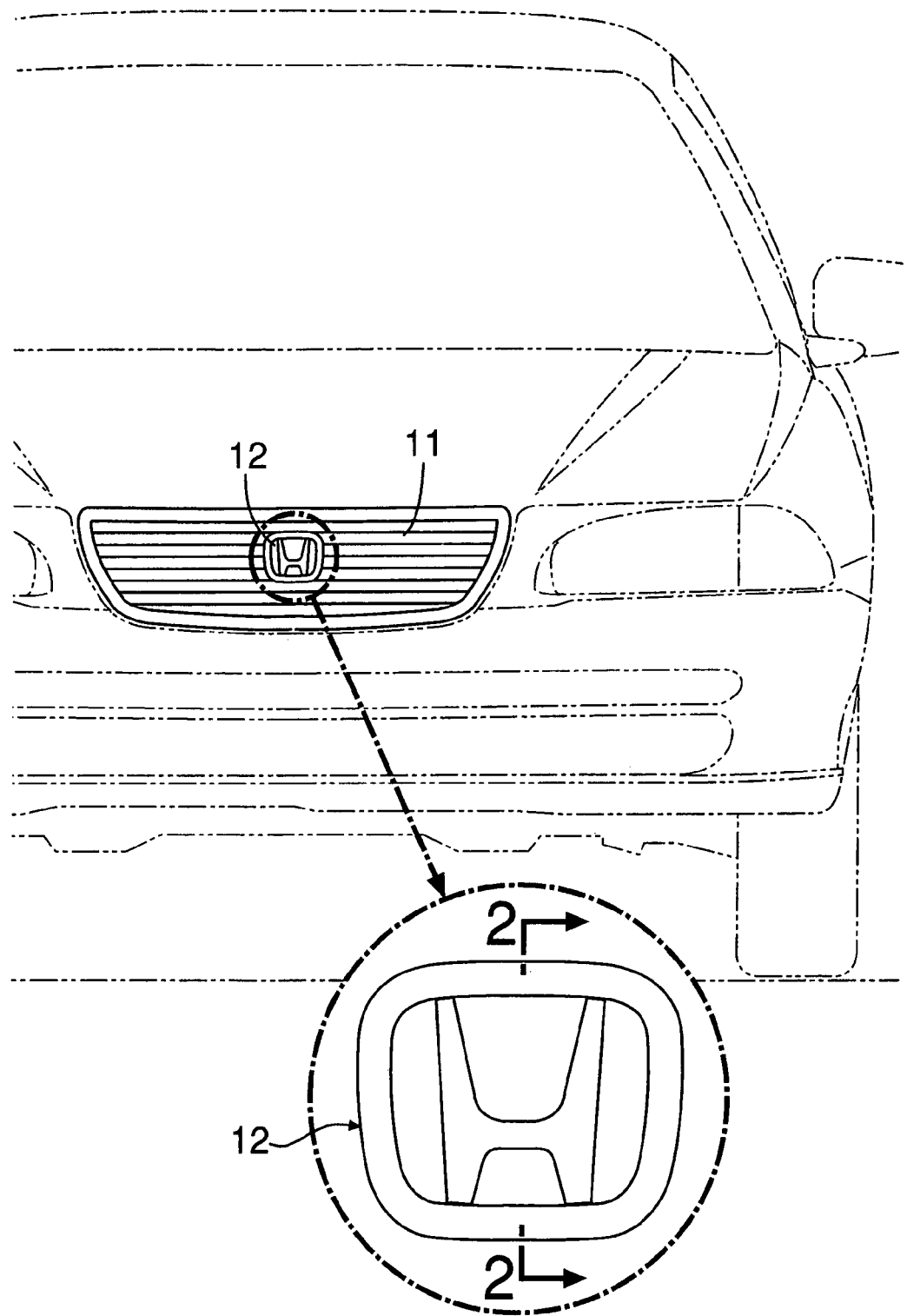
FIG. 1 is a front view of a front grill of an automobile.

As shown in FIG. 1, an emblem 12 for enhancing a design effect is mounted at a central portion of a front grill 11 of an automobile.

Figure 2:
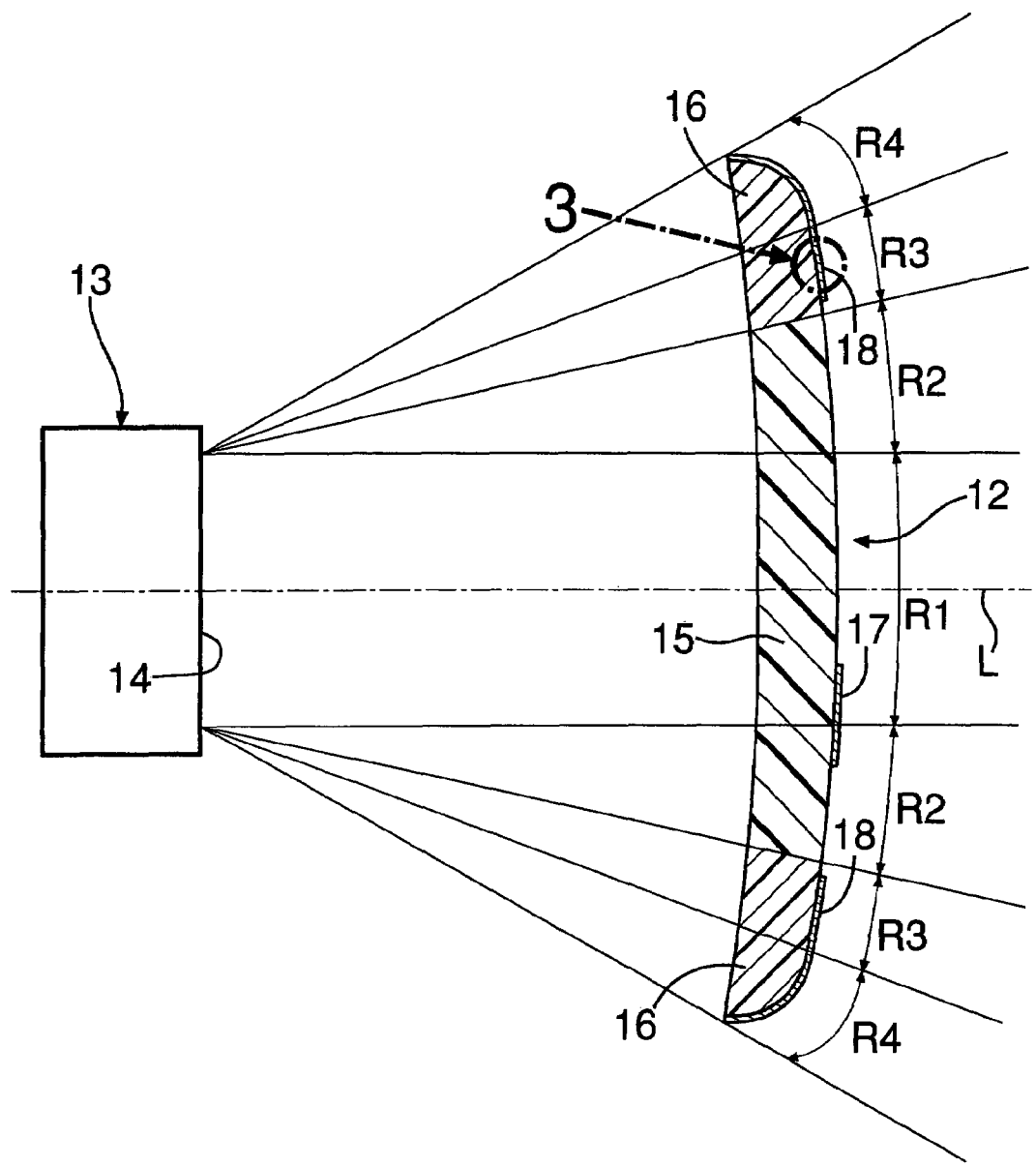
FIG. 2 is an enlarged cross-sectional view of the electromagnetic wave transmission member and proximity member taken along a line 2-2 in FIG. 1 according to an embodiment of the present invention.

FIG. 2 is a cross-sectional view of the emblem 12. A radar device 13 disposed behind the emblem 12 relative to a forward end of the subject automobile (or vehicle) is adapted to transmit an electromagnetic wave (millimeter wave) forward along an axis L from an antenna opening 14 provided in a front surface of the radar device 13. Also, the radar device 13 is adapted to receive the wave reflected from a detected object, thereby detecting a distance, a direction and relative speed of the obstacle, such as, for example, a vehicle located ahead of the subject vehicle.

The emblem 12 may have any suitable geometric shape. For example, the illustrated embodiment of the emblem 12 is a substantially quadrilateral plate-shape. The emblem 12 includes a centrally located electromagnetic wave transmission member 15 through which the axis L is passed, and a proximity member 16 integrally coupled with the member 15 and disposed in a frame-shape surrounding an outer periphery of the member 15. Most portions of electromagnetic waves transmitted from the radar device 13 and the electromagnetic waves received by the radar device 13 pass through a first region R1 having substantially the same area as the central antenna opening 14 defined in the electromagnetic wave transmission member 15. A second region R2 covered by the electromagnetic wave transmission member 15 extends a predetermined margin around the first region R1. The electromagnetic wave transmission member 15 defining the first region R1 and the second region R2 must maximize the amount any reflection of the electromagnetic wave is suppressed. If the electromagnetic wave to be detected is reflected from the object through the first and second regions R1 and R2, the electromagnetic waves reflected through the first and second regions R1 and R2 are superposed on each other, thereby reducing the detection accuracy of the radar device 13.

For this reason, the electromagnetic wave transmission member 15 defining the first region R1 and the second region R2 is formed from a common resin which is highly transmissible of electromagnetic waves and which reflects little of each electromagnetic wave. Further, a portion on a front surface of the electromagnetic wave transmission member 15 has a design color and is formed by depositing indium 17 thereon, wherein the indium 17 permits the transmission of the electromagnetic wave without reflecting the electromagnetic wave. It should be noted that the indium 17 deposit may be placed only on a section of the first region R1 or on a section that overlaps at least a portion of the first and second regions R1 and R2.

A third region R3 is spaced from the first region R1 by the second region R2. Although the electromagnetic wave passes directly through the first region R1, if a portion of the electromagnetic wave enters the third region R3 and is reflected, such an occurrence will likely adversely affect the detection accuracy of the radar device 13. As such, the third region R3 is designed to minimize the reflection of the electromagnetic wave. A fourth region R4 is sufficiently spaced from the first region R1 by the second and third regions R2 and R3. Hence, even if the electromagnetic wave is reflected by the fourth region R4, the detection accuracy of the radar device 13 is not adversely affected. Thus, it is unnecessary to consider a design for suppressing the reflection of the electromagnetic wave through the fourth region R4.

Therefore, a portion of the proximity member 16 including the third region R3 is formed of a particular resin which attenuates the electromagnetic wave passing through the proximity member 16 as compared with a regular or common resin. More specifically, the proximity member 16 is formed from either one of an acrylate-styrene-acrylonitrile resin or a modified polyphenylene oxide resin.

A chromium-plated portion 18 having a metallic design color is provided on a front surface of the proximity member 16 defined by the third and fourth regions R3 and R4 to reflect the electromagnetic wave.

Figure 3:
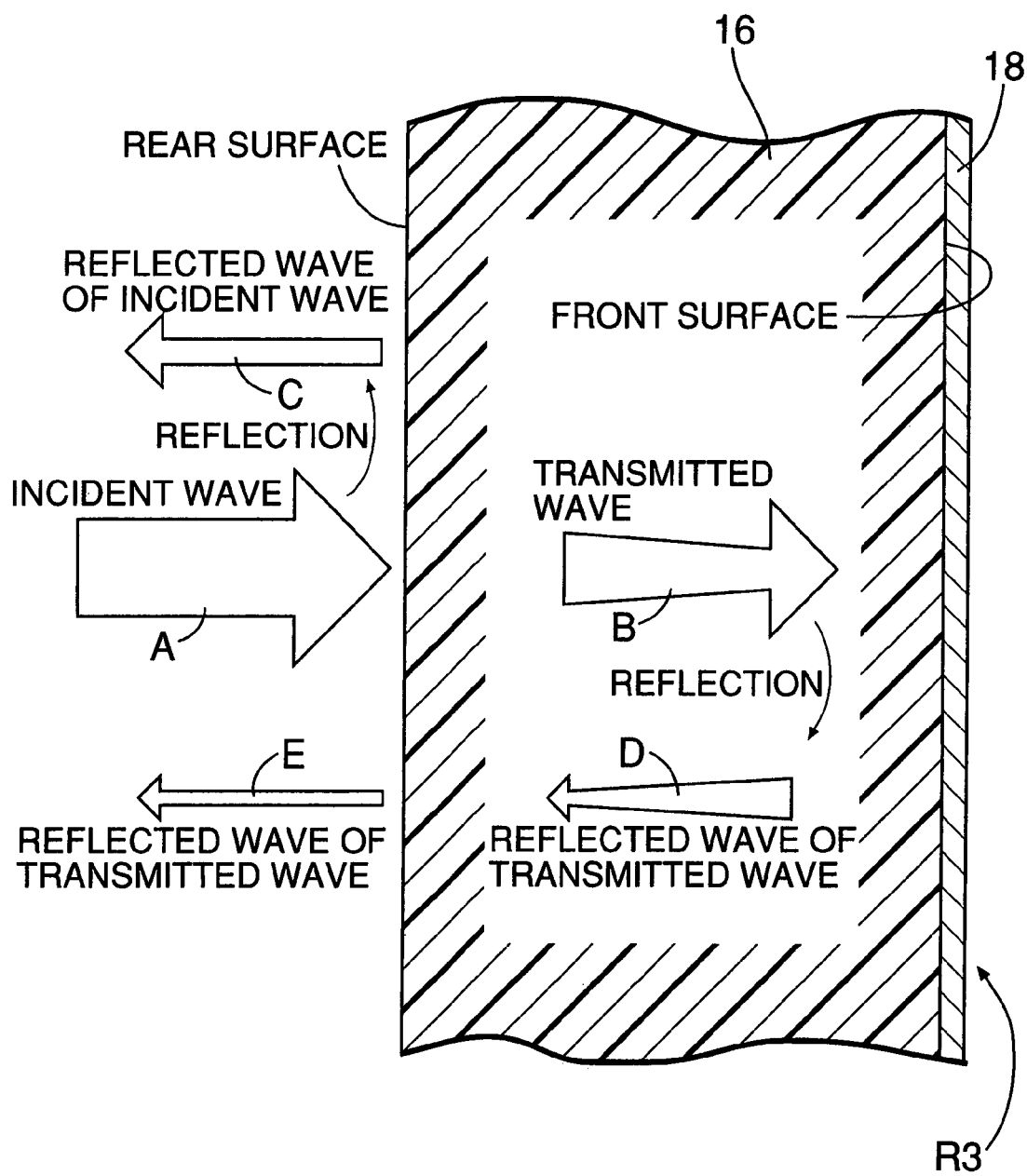
FIG. 3 is an enlarged view of a relevant portion of the invention in FIG. 2.

FIG. 3 is an enlarged sectional view of a portion of the third region R3. If an incidence wave A from the radar device 13 impinges a rear surface of the third region R3, a portion of the incidence wave A is transmitted as a transmission wave B through an interior of the proximity member 16, and a remaining portion of the incidence wave A is reflected off of a rear surface of the proximity member 16 and becomes a reflection wave C. The transmission wave B is attenuated during forward transmission through the interior of the proximity member 16 having a high attenuation coefficient and is almost completely reflected from the chromium-plated portion 18 on the front surface of the proximity member 16 to become a reflection wave D. The reflection wave D is further attenuated during rearward transmission through the interior of the proximity member 16 and is emitted from the rear surface of the proximity member 16 as a reflection wave E.

In the above-described embodiment, the material composition and thickness of the proximity member 16 are selected wherein the intensity of the reflection wave E is equal to or less than that of the reflection wave C. Although generation of the reflection wave C is inevitable, if the intensity of the reflection wave E is equal to or less than that of the reflection wave C, the weaker reflection wave E is buried in the stronger reflection wave C. As a result, the influence exerted on the detection accuracy of the radar device 13 becomes substantially less or negligible. Therefore, even if the chromium-plated portion 18, which is relatively inexpensive but reflects the electromagnetic wave, is provided to improve the design effect of the proximity member 16, it is possible to prevent an increase in the intensity of the reflection wave which adversely affects the detection accuracy of the radar device 13.

Figure 4A:
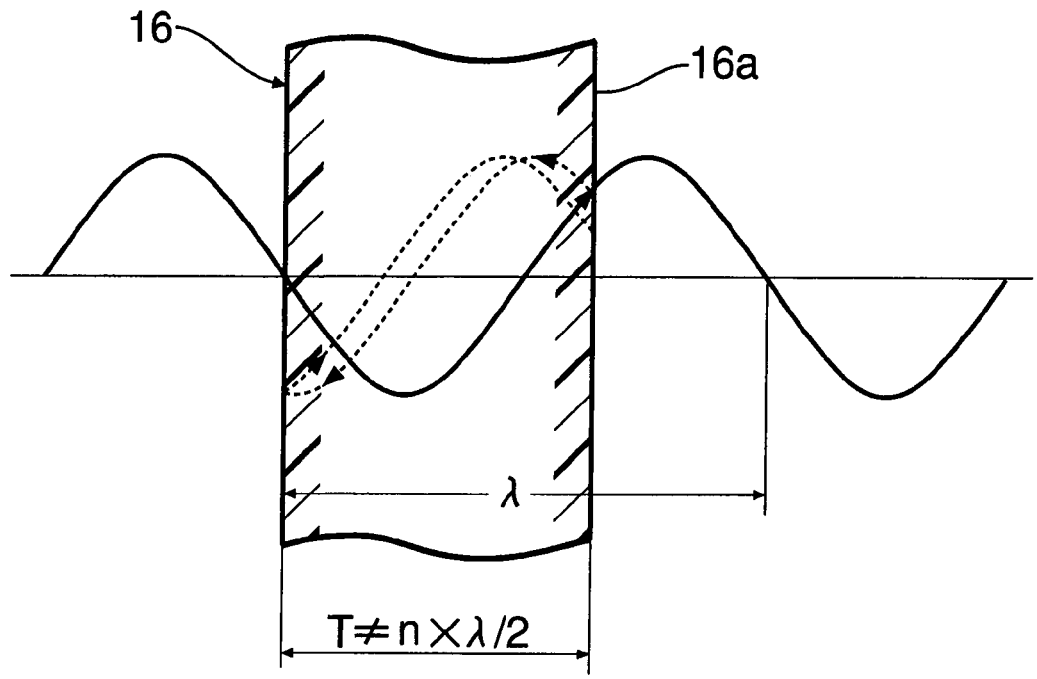
FIGS. 4A and 4B are diagrams which explain an influence exerted to an internal loss of an electromagnetic wave based on the thickness of an emblem.
Figure 4B:
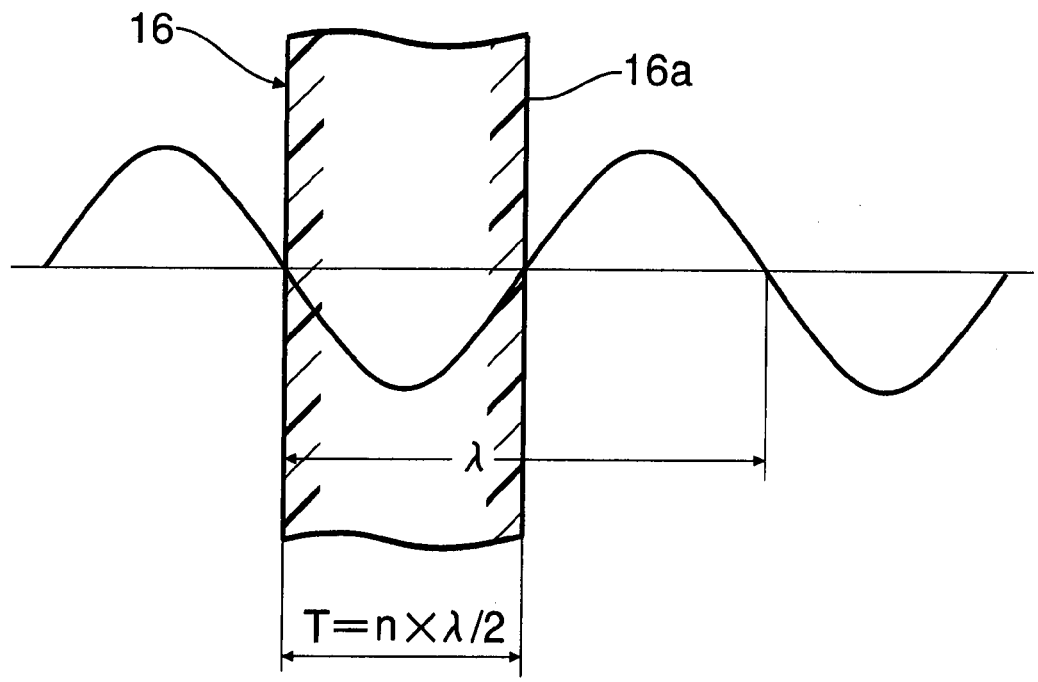

Further, in the above-described embodiment and in addition to selecting the material composition of the proximity member 16, the attenuation coefficient for the electromagnetic wave can be increased based on the selected thickness of the proximity member 16. As shown in FIG. 4A, when the wavelength of the electromagnetic wave is represented by $\lambda$, if the thickness T of the proximity member 16 is selected to have a value displaced from a value of n-times $\lambda/2$ (wherein n is an integer), the electromagnetic wave entering the proximity member 16 and the reflection wave resulting from the reflection of the electromagnetic wave on the surface 16a thereof counteract each other. Therefore, an internal loss is increased to increase the attenuation coefficient of the electromagnetic wave. On the other hand, as shown in FIG. 4B, when the wavelength of the electromagnetic wave is represented by $\lambda$, if the thickness T of the proximity member 16 is selected to have a value of n-times $\lambda/2$ (wherein n is an integer), the electromagnetic wave entering the proximity member 16 is not significantly affected by the reflection of the electromagnetic wave on the surface 16a. Therefore, the internal loss is decreased to decrease the attenuation coefficient of the electromagnetic wave. In this manner, an attenuation coefficient for electromagnetic wave transmission can easily be set merely by displacing the thickness T from a value integer-times $\lambda/2$, and the attenuation coefficient can further be increased by using the acrylate-styrene-acrylonitrile resin or the modified polyphenylene oxide resin, thereby further reducing the intensity of the unnecessary reflection wave exerting any adverse effects on the detection accuracy of the radar device 13.

As described above, it is unnecessary to deposit expensive indium, which does not reflect the electromagnetic wave, as the surface treatment on the proximity member 16, thereby increasing the degree of freedom in design and reducing the cost of the emblem 12.

The fourth region R4 of the proximity member 16 is sufficiently spaced from the first region R1 of the electromagnetic wave transmission member 15. Hence, even if the electromagnetic wave is reflected in the fourth region R4, an adverse effect cannot be exerted on the detection accuracy of the radar device 13. In the above-described embodiment, the fourth region R4 is formed of the same material as the third region R3 from the viewpoint of convenience in the manufacture of the emblem 12. However, for the above-described reason, the fourth region R4 may be formed of a material different from that of the third region R3 and may even be formed from any material.

Although the preferred embodiments of the present invention have been described in detail, various modifications in design may be made thereto without departing from the subject matter of the invention.

For example, the surface treatment of the third region R3 is provided to form the chromium-plated portion 18, but the surface treatment may be plating or coating with another metal. In short, the surface treatment of the first and second regions R1 and R2 is limited to the forming of a portion which does not reflect the electromagnetic wave, such as the indium-plated portion 18, whereas the surface treatment of the third region R3 (which also includes the fourth region R4) may form a portion which reflects the electromagnetic wave.

The exterior component according to the present invention is not limited to the emblem 12 in the preferred embodiments, and may be the front grill 11 itself or a dome covering the radar device 13.

Further, although the electromagnetic wave transmission member 15 and the proximity member 16 are described as being integrally coupled to each other, it is within the scope of the present invention for the electromagnetic wave transmission member 15 and the proximity member 16 not to be integral with each other. For example, the electromagnetic wave transmission member 15 may comprise the emblem 12, and the proximity member 16 may comprise the front grill 11.

What is claimed is:

1. An exterior component disposed on a front surface of a radar device of a vehicle and in an electromagnetic wave transmitting and receiving path located in front of the radar device mounted on the vehicle, the component comprising:
   an electromagnetic wave transmission member through which an electromagnetic wave passes; and
   a proximity member disposed along an outer perimeter of the electromagnetic wave transmission member and having a surface treated portion formed on a front surface thereof which reflects an electromagnetic wave,
   the proximity member being formed of a material having an attenuation coefficient for electromagnetic wave transmission equal to or larger than a predetermined value,
   said surface treated portion having a metallic design color that is visually recognizable from outside of the vehicle.

2. The component according to claim 1, wherein the proximity member is formed so that an intensity of the electromagnetic wave passing through a rear surface of the proximity member and reflected by the surface treated portion is emitted from the rear surface at a value equal to or greater than that of an electromagnetic wave reflected directly from a rear surface of the electromagnetic wave transmission member.

3. The component according to claim 2, wherein the attenuation coefficient of the proximity member is set corresponding to a thickness of the proximity member.

4. The component according to claim 1 wherein the proximity member is formed of an acrylate-styrene-acrylonitrile resin.

5. The component according to claim 1, wherein the proximity member is formed of a resin containing carbon particles or titanium oxide.

6. The component according to claim 5, wherein the resin is a modified phenylene oxide resin.

7. The component according to claim 1, wherein the surface treated portion is metal plating or a metal coating.

8. The component according to claim 1, wherein the component is an emblem provided on a front grill of the vehicle.

9. The component according to claim 1, wherein the electromagnetic wave transmission member is defined by a first region and a second region formed on an outer perimeter of the first region, and wherein the proximity member is defined by a third region and a fourth region, the third region being formed on an outer perimeter of the second region and the fourth region being formed on an outer perimeter of the third region.

10. The component according to claim 9, wherein the surface treated portion overlaps a front surface of the third and fourth regions.

11. The component according to claim 10, wherein the surface treated portion is metal plating or a metal coating.

12. The component according to claim 11, wherein the metal plating and the metal coating comprise chromium.

13. The component according to claim 1, wherein the electromagnetic wave transmission member has, on a front surface thereof, a further portion that has been subjected to a treatment permitting the electromagnetic wave to pass through said further portion, said further portion having a metallic design color that is visually recognizable from outside the vehicle.

14. An exterior component disposed on a front surface of a radar device of a vehicle and in an electromagnetic wave transmitting and receiving path located in front of a radar device mounted on the vehicle, the component comprising:
   an electromagnetic wave transmission member through which an electromagnetic wave passes; and
   a proximity member disposed along an outer perimeter of the electromagnetic wave transmission member and having a surface treated portion formed on a front surface thereof which reflects an electromagnetic wave,
   the proximity member being formed of a material having an attenuation coefficient for electromagnetic wave transmission equal to or larger than a predetermined value,
   wherein the electromagnetic wave transmission member is defined by a first region and a second region formed on an outer perimeter of the first region, and
   wherein the proximity member is defined by a third region and a fourth region, the third region being formed on an outer perimeter of the second region and the fourth region being formed on an outer perimeter of the third region, wherein the surface treated portion overlaps a front surface of the third and fourth regions.

15. The component according to claim 14, wherein the proximity member is formed so that an intensity of the electromagnetic wave passing through a rear surface of the proximity member and reflected by the surface treated portion is emitted from the rear surface at a value equal to or greater than that of an electromagnetic wave reflected directly from a rear surface of the electromagnetic wave transmission member.

16. The component according to claim 15, wherein the attenuation coefficient of the proximity member is set corresponding to a thickness of the proximity member.

17. The component according to claim 14, wherein the proximity member is formed of an acrylate-styrene-acrylonitrile resin.

18. The component according to claim 14, wherein the proximity member is formed of a resin containing carbon particles or titanium oxide.

19. The component according to claim 18, wherein the resin is a modified phenylene oxide resin.

20. The component according to claim 14, wherein the surface treated portion is metal plating or a metal coating.

21. The component according to claim 14, wherein the component is an emblem provided on a front grill of the vehicle.

22. The component according to claim 14, wherein the surface treated portion is metal plating or a metal coating.

23. The component according to claim 22, wherein the metal plating and the metal coating comprise chromium.

* * * * *